US010946995B2

(12) United States Patent
Suh et al.

(10) Patent No.: US 10,946,995 B2
(45) Date of Patent: Mar. 16, 2021

(54) EGG TRANSFER MODULE HAVING FREE-MOVING EJECTOR, AND ASSOCIATED SYSTEMS AND METHODS

(71) Applicant: Zoetis Services LLC, Parsippany, NJ (US)

(72) Inventors: William Dongwook Suh, Cary, NC (US); Christopher John Williams, Apex, NC (US); Michael Glenn Schnupper, Raleigh, NC (US); James Dennis Clarke, Jr., Holly Springs, NC (US)

(73) Assignee: Zoetis Services LLC, Parsippany, NJ (US)

( * ) Notice: Subject to any disclaimer, the term of this patent is extended or adjusted under 35 U.S.C. 154(b) by 0 days.

(21) Appl. No.: 16/362,763

(22) Filed: Mar. 25, 2019

(65) Prior Publication Data

US 2019/0291903 A1 Sep. 26, 2019

Related U.S. Application Data

(60) Provisional application No. 62/795,182, filed on Jan. 22, 2019, provisional application No. 62/647,976, filed on Mar. 26, 2018.

(51) Int. Cl.
*B65B 23/08* (2006.01)
*A01K 43/00* (2006.01)
(Continued)

(52) U.S. Cl.
CPC ............ *B65B 23/08* (2013.01); *A01K 43/00* (2013.01); *B65G 17/32* (2013.01); *A47J 29/06* (2013.01); *B65G 47/90* (2013.01)

(58) Field of Classification Search
CPC ............ B65B 23/08; B65G 2201/0208; B65G 17/23; B65G 17/323; B65G 47/90; A47J 29/06; A01K 41/06; A01K 43/00
(Continued)

(56) References Cited

U.S. PATENT DOCUMENTS 1,500,939 A * 7/1924 Howell .................. B65B 23/08
294/87.12
1,573,332 A 2/1926 Smythe et al.
(Continued)

FOREIGN PATENT DOCUMENTS

| EP | 468589 | * | 1/1992 | ............. B65B 23/08 |
| GB | 689173 | | 3/1953 | |
| WO | WO 2005/023378 A1 | | 3/2005 | |

OTHER PUBLICATIONS

PCT Search Report and Written Opinion, International Application No. PCT/US2019/023804, International filing date Mar. 25, 2019, dated Jun. 19, 2019.

*Primary Examiner* — James R Bidwell
(74) *Attorney, Agent, or Firm* — Scott C. Mayhew (57) ABSTRACT

An egg transfer module is provided. Such a device includes an egg securing device configured to grasp an egg. A free-moving ejector is associated with the egg securing device and configured to freely move in relation thereto. An abutment is provided in spaced relationship to the egg securing device. The free-moving ejector is configured to interact with the abutment to cause movement of the free-moving ejector with respect to the egg securing device, thereby displacing the egg from the egg securing device. Associated systems and methods are also provided.

9 Claims, 8 Drawing Sheets

(51) Int. Cl.
*B65G 17/32* (2006.01)
*A47J 29/06* (2006.01)
*B65G 47/90* (2006.01)

(58) Field of Classification Search
USPC .............. 198/867.02, 867.05, 867.11, 803.8, 198/803.14, 470.1, 482.1
See application file for complete search history.

(56) References Cited

U.S. PATENT DOCUMENTS

| | | | | |
|---|---|---|---|---|
| 2,792,253 | A * | 5/1957 | Bliss | B65B 23/08 294/100 |
| 4,015,704 | A * | 4/1977 | Warren | B65G 17/323 198/800 |
| 4,068,882 | A * | 1/1978 | van der Schoot | B65B 23/08 198/803.7 |
| 4,488,637 | A * | 12/1984 | Loeffler | B65B 23/08 198/803.9 |
| 4,776,465 | A * | 10/1988 | McEvoy | A01K 43/00 198/364 |
| 5,042,637 | A * | 8/1991 | LaVars | B07C 5/362 198/370.02 |
| 5,617,782 | A * | 4/1997 | Thomas | A47J 43/145 99/486 |
| 8,739,695 | B2 * | 6/2014 | Kristensen | A47J 43/145 99/500 |
| 2017/0210571 | A1 | 7/2017 | Suh | |

* cited by examiner

EGG TRANSFER MODULE HAVING FREE-MOVING EJECTOR, AND ASSOCIATED SYSTEMS AND METHODS

CROSS REFERENCE TO RELATED APPLICATIONS

This application claims the benefit of U.S. Provisional Patent Application Nos. 62/647,976, filed Mar. 26, 2018, and 62/795,182, filed Jan. 22, 2019, both of which are expressly incorporated herein by reference in their entirety.

TECHNICAL FIELD

The present disclosure generally relates to egg processing devices. More particularly, the present disclosure relates to an egg transfer module capable of providing flexibility to transfer eggs of various shapes, sizes, and orientations, and associated systems and methods.

BACKGROUND

Various mechanical egg processing systems may be used to process avian eggs within a poultry hatchery facility or other egg processing facility (e.g., table eggs). In a hatchery, such mechanical egg processing systems may include, for example, a transfer system for transferring eggs from a tray (commonly referred to as a "flat") associated with a setter incubator to a container (commonly referred to as a "hatching basket") associated with a hatcher incubator. In other instances, an example of such mechanical egg processing systems may include an egg removal system for removing certain eggs from the flats. In the case of egg removal systems, it is common practice to remove non-live eggs from live eggs to increase available incubator space, to reduce the risk of contamination, and to save vaccine costs related to in ovo inoculations. In a facility that processes table eggs, the eggs may be mechanically or manually moved for a variety of reasons.

Once an egg has been lifted from a flat, either for transfer or removal purposes, the egg must be dislodged from the lifting devices responsible for securing and moving the egg. In some instances, suction-type lifting devices are implemented in which case simply cutting off the suction can be used to disgorge the egg. However, in some instances the egg may be mechanically gripped such that a force is required to displace the egg from the lifting device. Issues with current mechanical displacement means include egg cracking, cleanability, power requirements, complexity, ease of maintenance and entanglement with the gripping means.

Accordingly, it would be desirable to provide an egg transfer module and associated system capable of consistently displacing gripped eggs in a simplified manner and having the flexibility to account for eggs of various shapes, sizes, and gripped orientations. Furthermore, it would be desirable to provide an associated method that would simplify and facilitate improved displacement of gripped eggs.

BRIEF SUMMARY

The above and other needs are met by aspects of the present disclosure which, according to one aspect, provides an egg transfer module having an egg securing device configured to grasp an egg. A free-moving ejector is associated with the egg securing device and configured to freely move in relation thereto. An abutment is provided in spaced relationship to the egg securing device. The free-moving ejector is configured to interact with the abutment to cause movement of the free-moving ejector with respect to the egg securing device, thereby displacing the egg from the egg securing device.

Another aspect provides a method of transferring eggs. The method comprises grasping an egg with an egg securing device. The method further comprises moving the egg with the egg securing device. The method further comprises displacing the egg from the egg securing device with a free-moving ejector associated with the egg securing device and configured to freely move in relation thereto, the free-moving ejector being configured to interact with an abutment to cause movement of the free-moving ejector with respect to the egg securing device.

Thus, various aspects of the present disclosure provide advantages, as otherwise detailed herein.

BRIEF DESCRIPTION OF THE DRAWINGS

Having thus described various embodiments of the present disclosure in general terms, reference will now be made to the accompanying drawings, which are not necessarily drawn to scale, and wherein:

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

The present disclosure is directed to devices, systems and methods configured to grasp and eject eggs for transfer thereof in a simplified manner. According to some aspects, the present disclosure provides improved mechanical means for grasping and ejecting eggs, as compared to suction-type egg lifting devices. It is, however, understood that the mechanical ejection means disclosed herein may also be implemented on suction-type egg lifting devices for dislodging eggs from such suction-type devices.

Such mechanical grasping and ejecting aspects of the present disclosure provide many advantages, including simplifying the means for securing and ejecting eggs, improving ease of maintenance, improving reliability, and improving adaptability to grasp and eject eggs of various sizes, shapes, and orientations. In this regard, the problem to be solved relates to seeking simplified mechanical handling of eggs, particularly with respect to those containing live embryos, in which the risks of cracking are reduced by providing a solution in which adaptability is provided for capturing and ejecting eggs of various shapes and sizes and positioned at various orientations.

Figure 1:
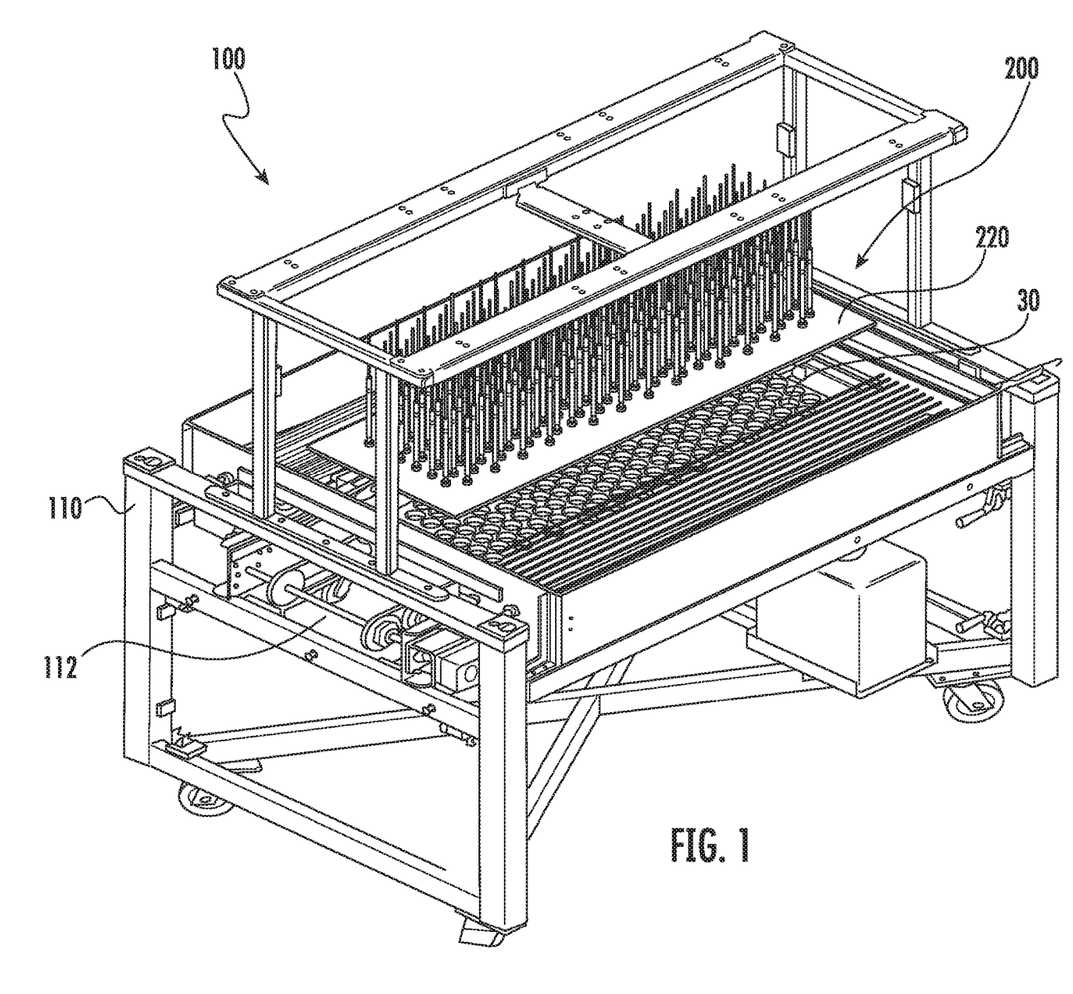
FIG. 1 is a perspective schematic view of an egg processing system capable of implementing a plurality of egg transfer modules, according to one aspect of the present disclosure.

FIG. 1 illustrates an automated egg processing system 100. According to the particular aspect shown in FIG. 1, the egg processing system 100 is capable of removing and/or transferring eggs. Aspects of the present disclosure, however, are not limited to the illustrated egg processing system 100 of FIG. 1. Aspects of the present disclosure may be implemented on any system or apparatus in which securement of eggs is desired, where the secured eggs must then be deposited at some point later in time. For example, aspects of the present disclosure may be implemented on an egg transfer system used to transfer eggs from a setter incubator tray (a so-called "egg flat") to a hatch incubator tray (a so-called "hatching basket"). In other instances, aspects of the present disclosure may be implemented on an egg remover system used to remove undesirable eggs (e.g., containing a non-viable embryo) from an egg flat prior to in ovo injection or prior to transfer into a hatching basket.

As shown in FIG. 1, the egg processing system 100 may be particularly adapted for removing eggs positioned within an egg flat, which includes a plurality of receptacles for individually receiving and maintaining eggs in a generally vertical orientation, although the eggs may often be tilted to varying degrees within the individual receptacles. Using the egg processing system 100, all or selected eggs may be removed from an egg flat when positioned below an egg processing head 200.

According to some aspects, the egg processing system 100 may include a frame 110 and a conveyor assembly 112 provided to move egg flats in an automated manner through the egg processing system 100 to a removal position. The conveyor assembly 112 may include a guide rail system configured to receive and guide egg flats to the removal position. The conveyor assembly 112 may further include appropriate stop elements, sensors, belts, endless loops, motors, etc. for proper indexing and positioning of egg flats within the egg processing system 100. In some instances, egg flats may be manually advanced through the egg processing system 100.

Eggs entering the egg processing system 100 via egg flats may have varying classification characteristics. For example, egg flats may include eggs that are classifiable based on viability, pathogen content, genetic analysis, or combinations thereof. As such, eggs are passed through an egg classifier system to generate a classification for each egg contained in an egg flat. Such eggs may be classified as viable or non-viable (i.e., those eggs not containing a viable embryo according to the egg classifier system), wherein the non-viable eggs may be further sub-classified as, for example, infertile, rotten, or dead eggs. Exemplary egg classifier systems may be capable of classifying the eggs by using, for example, candling techniques (opacity, infrared, NIR, etc.), assaying techniques, or other known and suitable classification methods, processes, or techniques. After classification, the eggs may be removed accordingly from the egg flat using the egg processing system 100 according to the identified classification, such as, for example, removing non-viable eggs from the egg flat.

Figure 4:
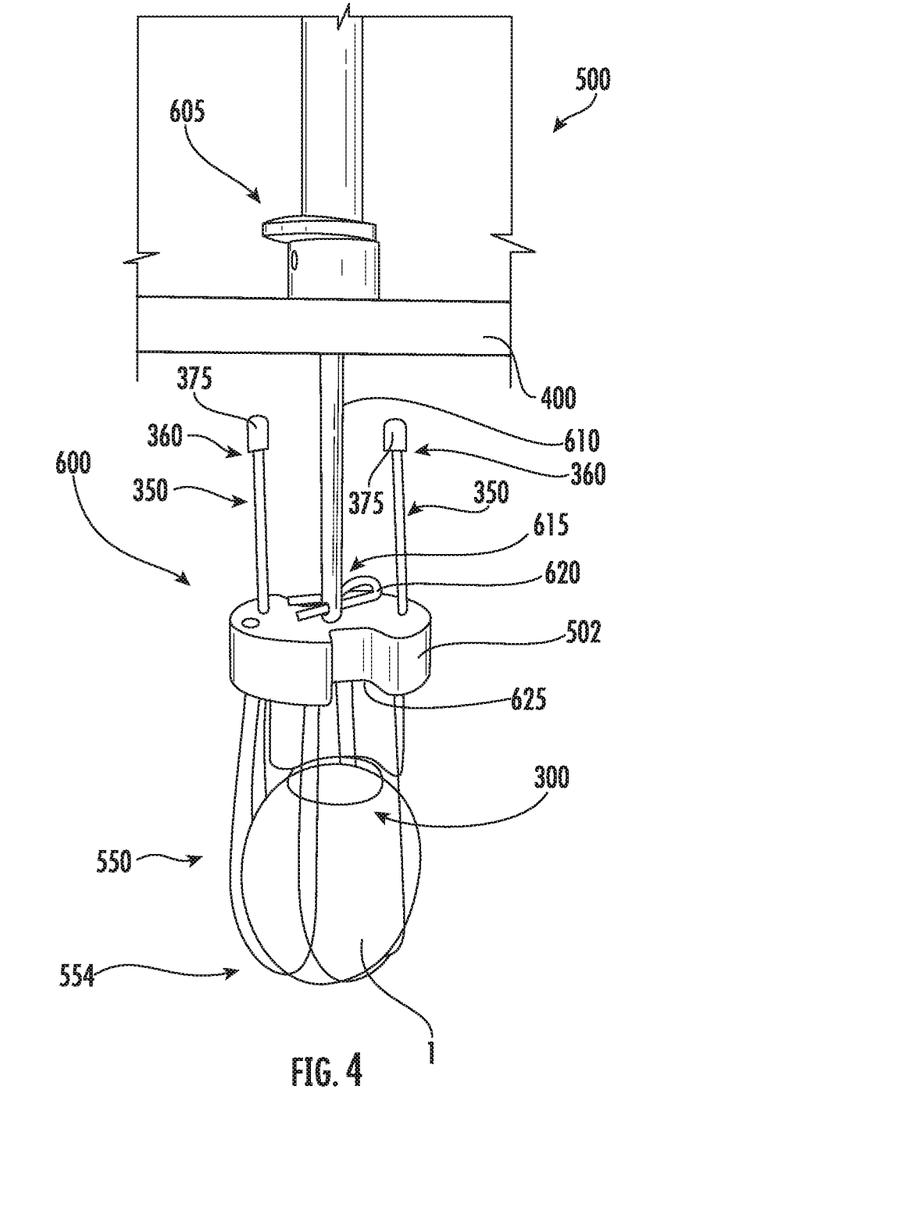
FIG. 4 is a side view of an egg held by an egg transfer module, according to one aspect of the present disclosure.
Figure 9:
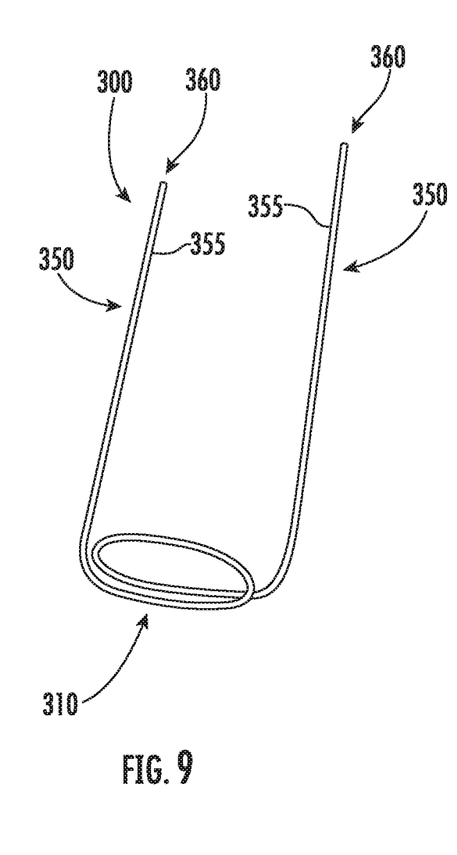
FIG. 9 is a perspective view of an ejector capable of use in an egg transfer module, according to yet another aspect of the present disclosure.

As shown in FIG. 1, the egg processing system 100 may include the egg processing head 200 coupled to the frame 110. According to aspects of the present disclosure, the egg remover head 200 may include a plurality of egg transfer modules 500, as shown in FIGS. 4 and 9, capable of selectively or non-selectively grasping eggs from the egg flat. In some instances, the egg processing head 200 may include a plate 220 to which one or more egg securing devices 600 are secured, coupled, or otherwise engaged. According to some aspects, the plate 220 may define a plurality of holes for receiving the egg securing devices 600. In some instances, the egg securing devices 600 may be selectively or individually controlled. That is, the egg securing devices 600 may be selectively deployed such that interaction thereof with respective eggs may be selectively controlled. For example, the egg securing devices 600 may be configured to selectively engaging respective eggs such that only those eggs identified as a first subset (e.g., as live or viable) of eggs are contacted for removal or transfer from the egg flat. In such instances, a second subset (e.g., non-live or non-viable) of eggs may remain in the egg flat for further processing without contact from any of the egg securing devices 600.

According to some aspects, the conveyor assembly 112 may transport eggs stored in the egg flat past the egg classifier system so that each egg passes therethrough such that data (egg classification status) may be generated for each egg. The data collected by the egg classifier system may be provided to a controller for processing and storing data associated with each egg. The controller may then be capable of generating a selectable removal signal to send to the egg securing devices 600 so that individual egg securing devices 600 (or subsets of egg securing devices 600) are separately and individually deployed at various positions according to the classification status for each egg based on the data collected by the egg classifier system.

In other instances, the egg processing apparatus 100 may include the egg processing head 200 coupled to the frame 110 and configured to move vertically for interacting with eggs contained within an egg flat when in a removal position beneath the egg processing head 200. The egg processing head 200 may be pneumatically or electrically driven to move vertically for facilitating interaction with eggs in the egg flat. In some instances, the egg processing head 200 may be lowered and raised pneumatically using a transfer cylinder (not shown) in fluid communication with a pneumatic system, as known by those of skill in the art. In some instances, the egg transfer modules 500 may be positioned on a head attached to a frame of a robotic system having an articulating robotic arm. The robotic system may have a guidance system configured to position the egg transfer modules 500 proximate to the egg for engagement therewith.

Figures 2, 3:
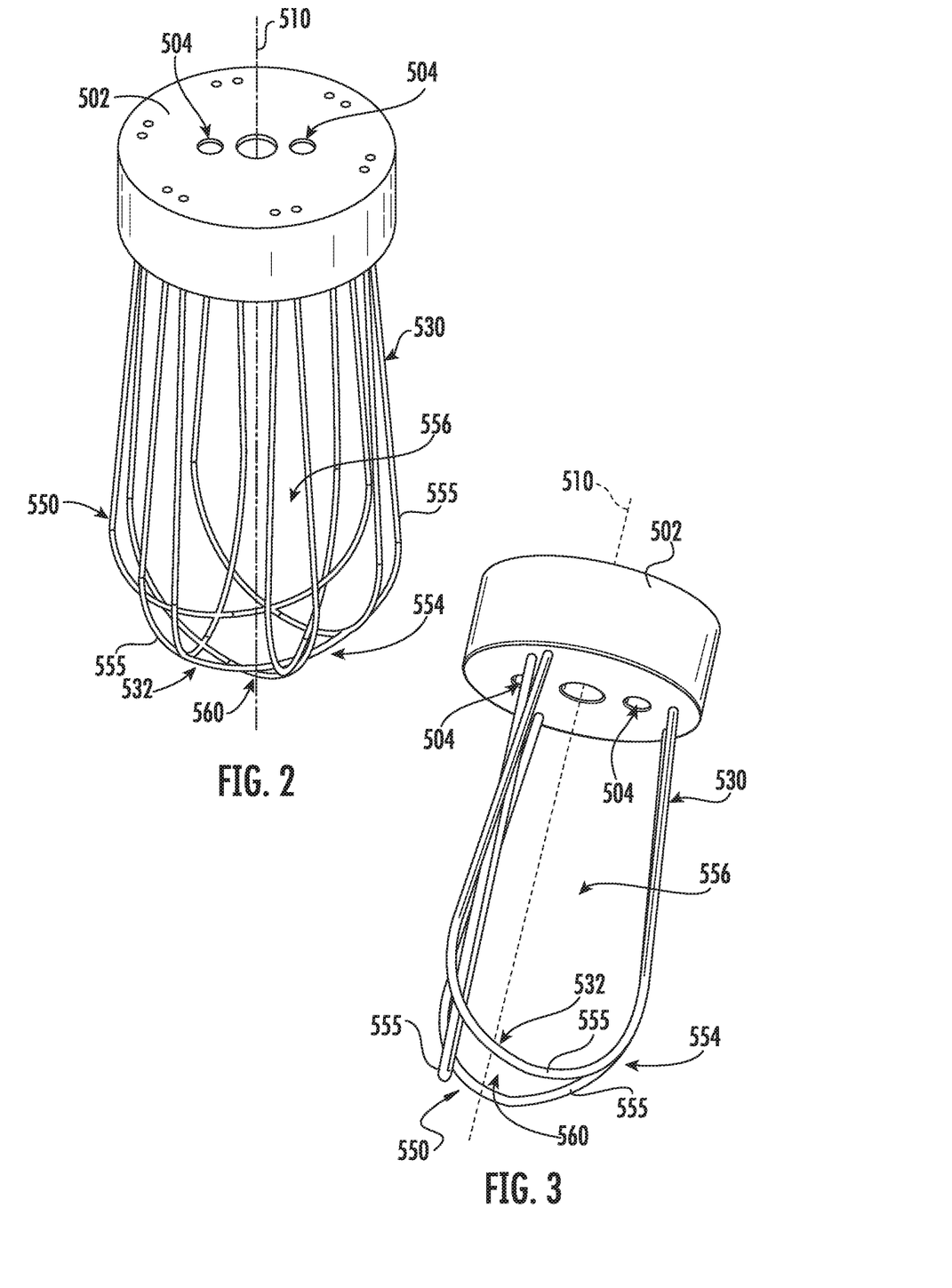
FIGS. 2 and 3 are perspective schematic views of various securing arrangements for an egg securing device, according to aspects of the present disclosure.

The egg processing system 100 may be configured to engage or contact eggs for removal thereof from the egg flat using an egg securing device 600 of the egg transfer module 500. According to some aspects, as shown in FIGS. 2 and 3, the egg securing device 600 may include a securing arrangement 550 formed of a plurality of engagement members 555, which cooperate to form a sheath-like structure capable of mechanically grasping an egg. In some instances, the securing arrangement 550 may extend from a body 502, wherein the body 502 acts as a base from which the engagement members 555 project. The body 502 may be of unitary construction with the engagement members 555, while in other instances the body 502 may be discretely formed with respect to the engagement members 555. The engagement members 555 define a cavity 556 in which the egg is retained.

The engagement members 555 may be configured to mechanically capture an egg using physical contact and interaction such that the egg may be seized from the egg flat or other container or surface. The engagement members 555 may be capable of deflecting about the egg as the engagement members 555 advance or descend upon the egg such that the egg becomes seated or secured within the cavity 556 formed by the engagement members 555. The engagement members 555 may define an opening 560 through which the egg is passed for seating. A central axis 510 may be defined by the egg securing device 600 lengthwise along its longitudinal axis. The opening 560 is defined about the central axis 510 and formed at a distal end 554 of the egg securing device 600. The opening 560 may be defined as any number of sizes and shapes. The engagement members 555 may deflect about the egg for capturing the egg and retaining the egg within the cavity 556 without mechanical actuation of the engagement members 555, although in some instances mechanical actuation of the engagement members 555 may be implemented.

According to some aspects, the engagement members 555 may extend or project from the body 502. In some instances, as shown in FIG. 2, the engagement members 555 may be interlaced to form an overlapping sleeve arrangement that encircles and surrounds the egg. The engagement members 555 may have various sizes, arrangements, or structures that permit the grasping of an egg using physical contact and engagement therewith as the means for capturing the egg.

According to various aspects, as shown in FIGS. 2 and 3, the engagement members 555 may be loops extending from the body 502 to largely form a U-shape. In this particular arrangement, each engagement member 555 may have a pair of leg segments 530 extending from the body 502 and connected by an arcuate segment 532. The engagement members 555 may have a length sufficient for receiving eggs of varying size. As the distal end 554 of the egg securing device 600 interacts with the egg, the arcuate segments 532 physically contact the egg and advance along the shell contours as the engagement members 555 encapsulate the egg. The engagement members 555 may extend from the body 502 at various angles.

According to some aspects, the engagement members 555 may be formed of a pliant, flexible or resilient material so as to deflect about the egg when coming into contact therewith. The engagement members 555 may be constructed from various materials that exhibit such deflective, elastic, or resilient qualities, such as, for example, resilient materials, elastic materials, super-elastic materials, pseudo-elastic materials, and shape memory materials. In some instances, the engagement members 555 may be constructed of a shape-memory material (e.g., shape memory alloy or shape memory polymer) that has the ability to return from a deformed state (temporary shape) to its original (permanent) shape. In some instances, the shape-memory material may return to its original shape when induced by an external stimulus such as temperature change. In other instances, the engagement members 555 may be constructed of a super-elastic alloy (e.g., nickel titanium (nitinol)) that when deformed returns to its pre-deformed shape without external stimulus. When mechanically loaded, a super-elastic alloy deforms reversibly to very high strains (up to 10%) by the creation of a stress-induced phase. When the load is removed, the new phase becomes unstable and the material regains its original shape. Such super-elastic materials, pseudo-elastic materials, and shape memory materials provide the benefit of resisting fatigue, an important factor when considering the substantial quantity of production eggs processed in hatchery and table egg industries. Examples of materials suitable for use in accordance with the present disclosure include, but are not limited to, nitinol, CuZnAl alloys, CuAlNi alloys, and CuAlBe alloys. Further, shape-memory polymers may be suitable for use, such as polyurethanes or block copolymers (e.g., polyethylene terephthalate (PET), polyethyleneoxide (PEO), etc.) in accordance with the present disclosure. In some instances, the engagement members 555 may be constructed of metal alloys (e.g., stainless steel) or polymer components, or combinations thereof. In some instances, the engagement members 555 may be in the form of resilient or flexible wire (metal or polymer strand).

According to some aspects, the egg securing device 600 may include an actuator capable of advancing the engagement members 555 on the egg in order to capture the egg. The actuator may be a linear actuator 605 such as, for example, a pneumatically controlled cylinder having a piston rod 610 with an end 615 that may be attached, coupled or otherwise operably engaged with the body 502 (such as by an upper pin 620 and a lower pin 625) such that movement of the body 502 by actuation of the piston rod 610 causes movement of the engagement members 555 as well, since in some instances the engagement members 555 are fixedly attached to the body 502. In instances where the egg securing devices 600 are selectively controlled, each actuator may be capable of receiving a signal indicating the egg classification status of respective eggs in the egg flat such that the actuators may be selectively actuated, thereby facilitating engagement or contact of certain select egg securing devices 600 with respective eggs.

According to some aspects, the egg transfer module 500 may include an ejector 300 configured to eject, dislodge, disgorge, displace, or otherwise release the egg from the securing arrangement 550 of the egg securing device 600. In some instances, the ejector 300 may be free-moving in which the ejector 300 has freedom of movement with respect to the egg securing device 600. That is, the ejector 300 moves freely, without actuation, with respect to the egg securing device 600 even though the ejector 300 and egg securing device 600 are coupled in some manner. This may be referred to as a "floating" ejector 300 wherein an external force is provided to move the ejector 300 with respect to the egg securing device 600 or components thereof. For example, the ejector 300 may come into contact with the egg when the egg securing device 600 grasps an egg, thereby forcing the ejector 300 upward as the egg is advanced within the cavity 556, as shown in FIG. 4, whereby the ejector 300 "floats" on the egg (i.e., provides little or no resistance) as it is advanced within the securing arrangement 550. Similarly, an external force may be provided to eject the egg from the securing arrangement 550 by forcing the ejector 300 towards the distal end 554 of the securing arrangement 550. By implementing an egg displacement scheme without actuation means, the overall egg transfer module 500 is simplified and more cost-effective. That is, the ejector 300 does not need additional power such as an active mechanical push for ejecting an egg, but instead provides a simple, passive ejection scheme, thereby improving operation of the egg transfer module 500 and its reliability. Moreover, because the ejector 300 "floats," it does not require permanent assembly and therefore may be easily detached for replacement or cleaning.

Figure 7:
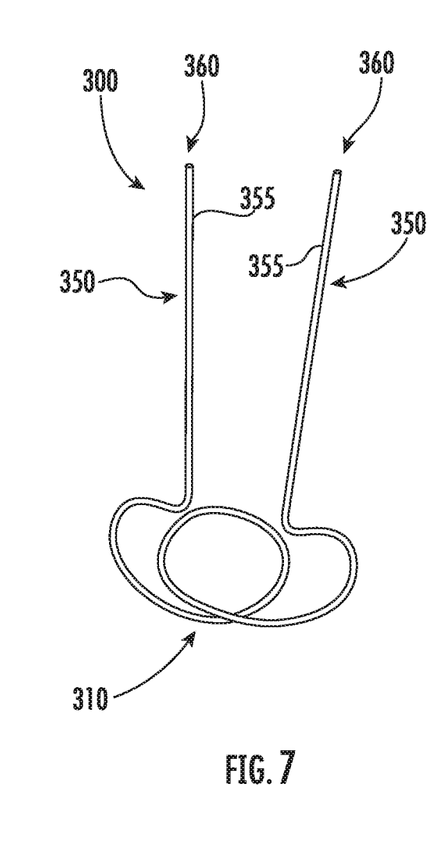
FIG. 7 is a perspective view of an ejector capable of use in an egg transfer module, according to one aspect of the present disclosure.
Figure 8:
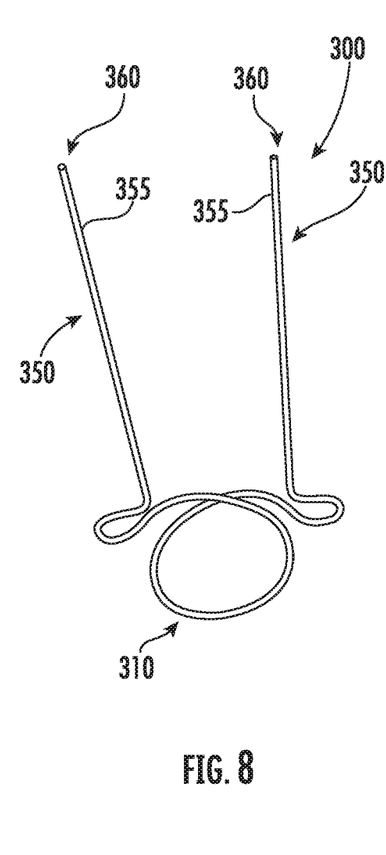
FIG. 8 is a perspective view of an ejector capable of use in an egg transfer module, according to another aspect of the present disclosure.

According to various aspects, as shown in FIGS. 7-9, the ejector 300 may be formed of one or more resilient materials such as, for example, in the form of a resilient wire structure. In some instances, the material(s) selected for the ejector 300 may be the same as the material(s) used to construct the engagement members 555, as previously described above; although in other instances the materials may be different. The shape of the ejector 300 may take many different forms, structures or configurations in order to make contact with the egg and physically displace the egg from the securing arrangement 550.

According to some aspects, the ejector 300 may include one or more engagement portions 310 capable of contacting the egg to force the egg out of engagement with the securing arrangement 550. The engagement portion 310 may be shaped in a such manner as to distribute the ejecting force in order to reduce the likelihood of cracking the egg, particularly when the egg has been subjected to an in ovo injection event in which a hole is created in the egg shell (typically at one end of the egg). For example, as shown in FIGS. 7-9, the engagement portion 310 may be substantially circular so as to encircle an end of the egg when in contact therewith (see FIG. 4). Further, the ejector 300 may be configured to provide flexibility and/or resiliency by structuring the wire in a spring-like or biasing manner, which may also be facilitated by the use of shape-memory materials or the like. In this regard, a segment of the engagement portion 310 and/or the driven member(s) 350 may be at least partially coiled or other tortuous structure. The configuration of the ejector 300 may be preferably shaped to avoid entanglement with the securing arrangement 550.

Figures 5, 6:
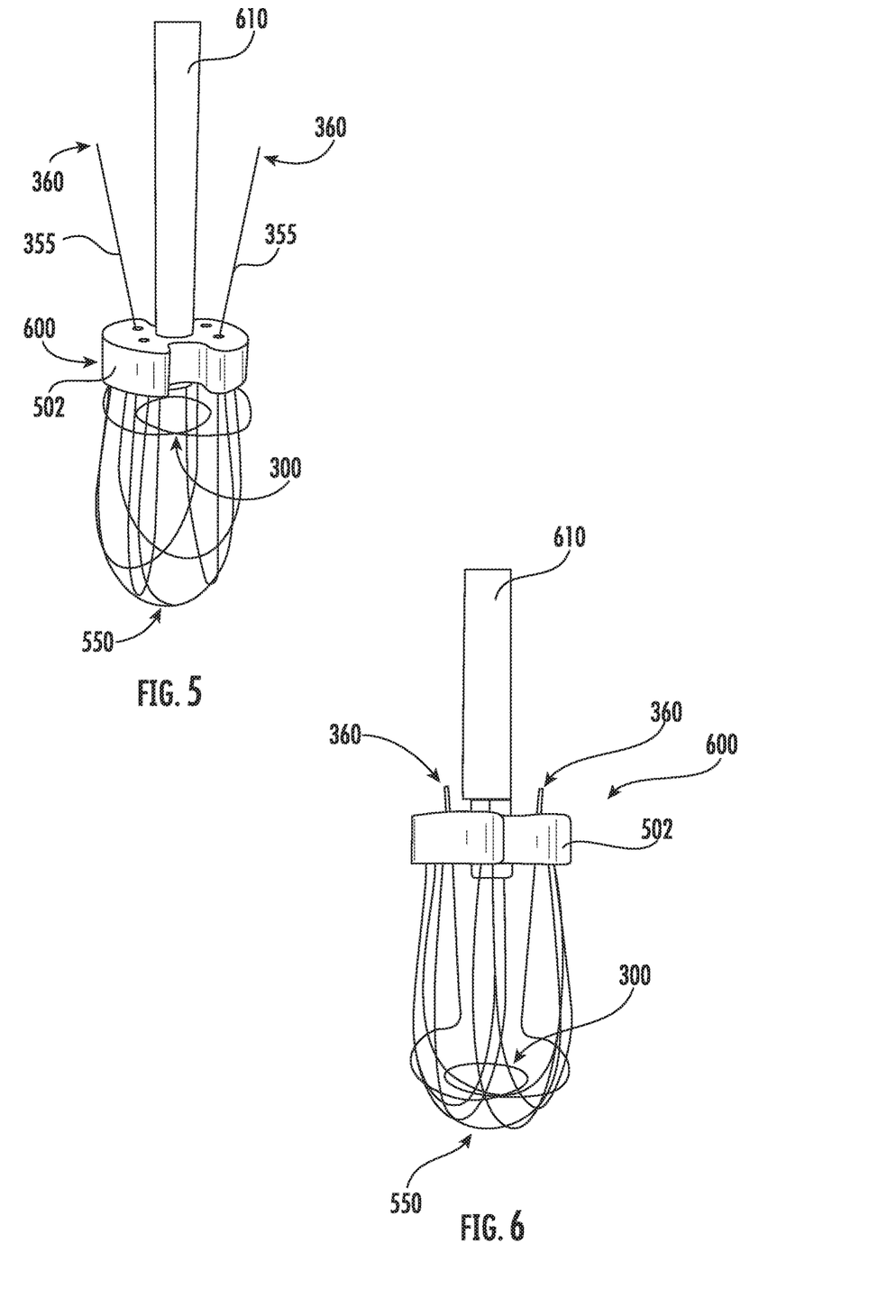
FIG. 5 is a perspective view of an ejector coupled to an egg securing device, the ejector being in a retracted position, according to one aspect of the present disclosure.
FIG. 6 is a perspective view of an ejector coupled to an egg securing device, the ejector being in a deployed position, according to one aspect of the present disclosure.
Figure 11:
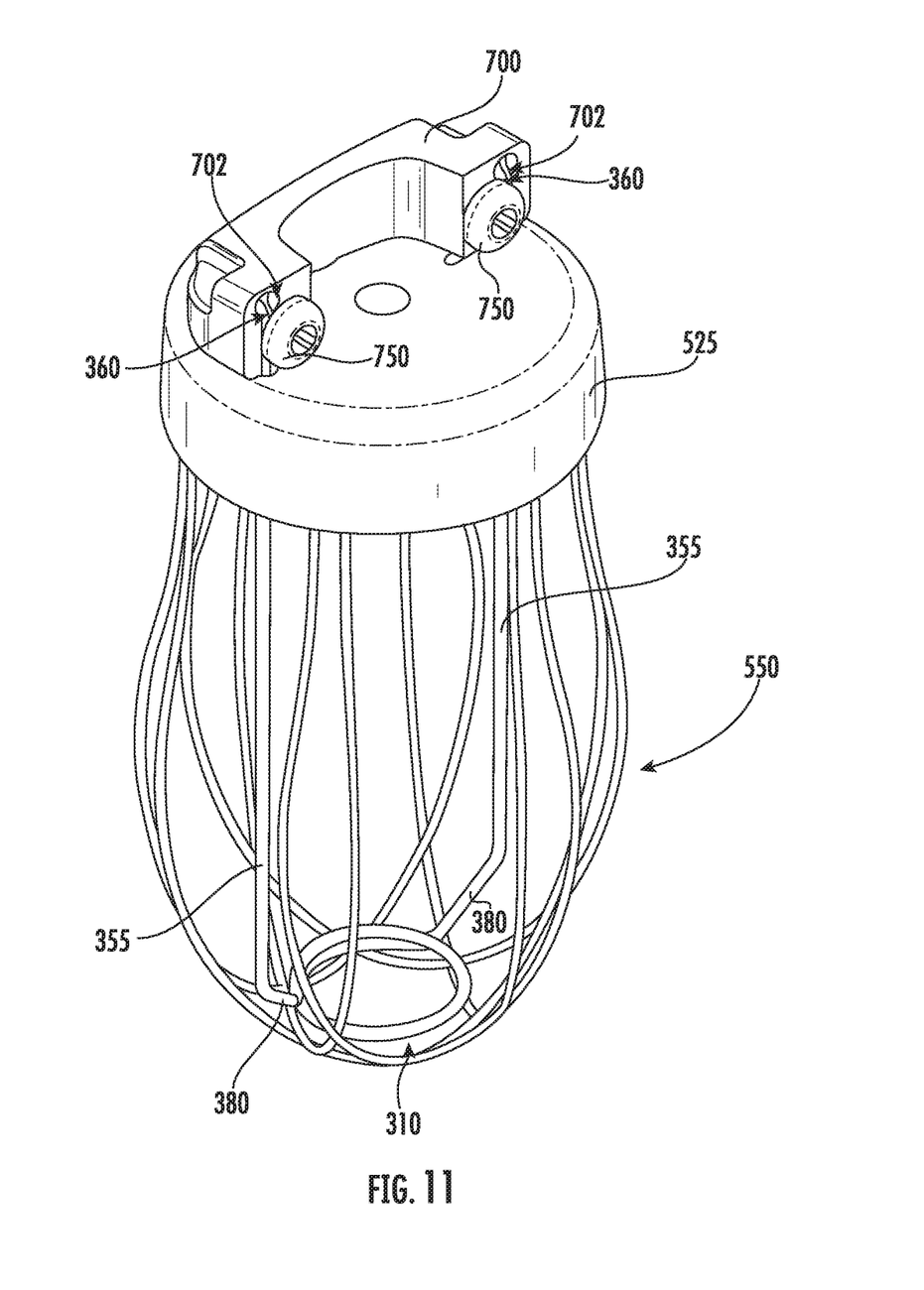
FIG. 11 is a perspective view of a portion of an egg transfer module having a retainer, according to one aspect of the present disclosure.
Figure 12:
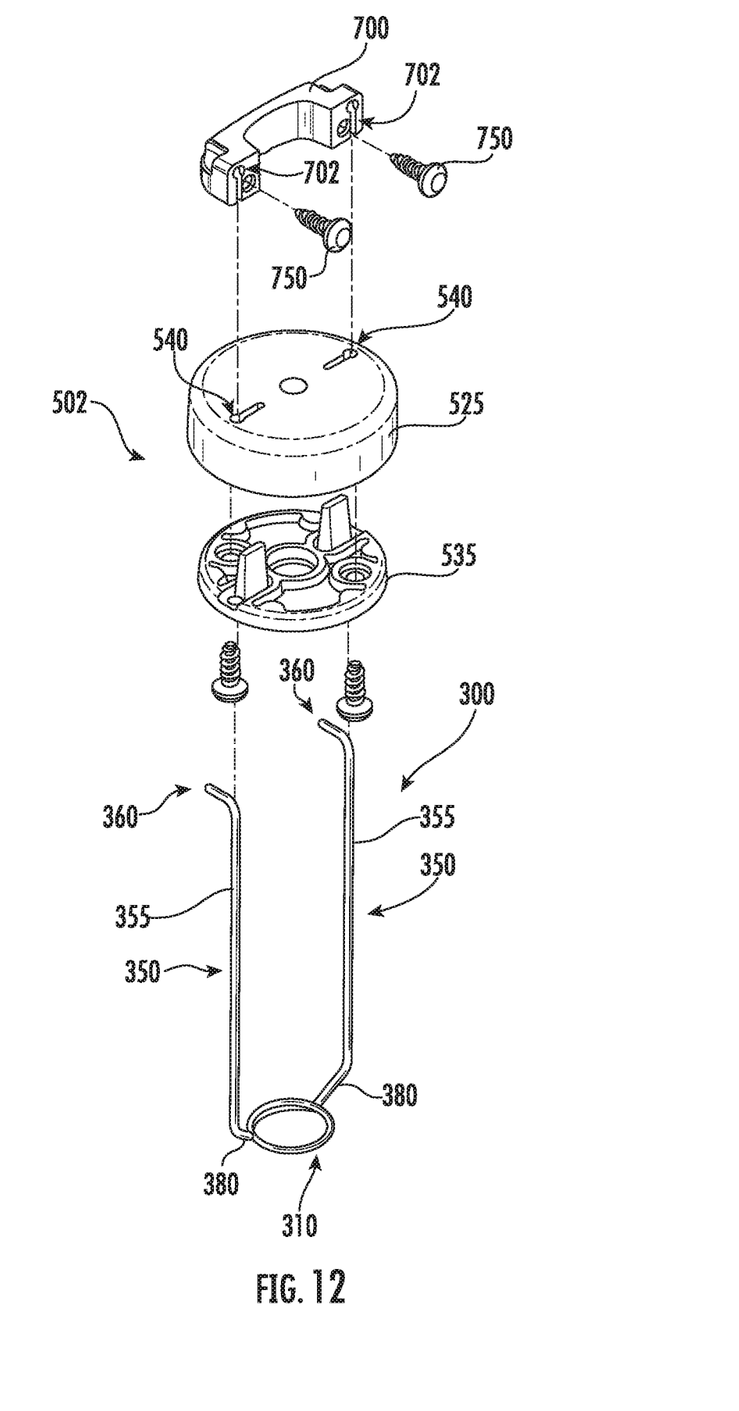
FIG. 12 is an exploded perspective view of a portion of an egg transfer module having a retainer, according to one aspect of the present disclosure.

In order to provide passive and non-actuated release of the egg, the ejector 300 may interact with an abutment 400, as shown in FIG. 4, which in some instances may be the plate 220 to which the egg securing device 600 is attached. The purpose of the abutment 400 may be to forcedly advance the ejector 300 toward the distal end 554 of the securing arrangement 550, thereby displacing the egg from the egg securing device 600. According to various exemplary aspects, as shown in FIGS. 7-9, the ejector 300 may include one or more driven members 350, such as stems 355. The driven member(s) 350 may be directly or indirectly attached to the engagement portion 310. In some instances, as shown in FIGS. 11 and 12, the driven members 350 may be connected to the engagement portion 310 by tapered portions 380. The abutment 400 may contact the driven member(s) 350 to advance the engagement portion 310 for dislodging the egg 1 from the securing arrangement 550. In some instances, the abutment 400 may be stationary such that the driven member(s) 350 are advanced toward the abutment in order to cause the physical interaction therebetween, while in other instances the driven members 350 may be stationary such that the abutment 400 is advanced in order to cause the physical interaction therebetween. Regardless, this interaction between the driven member(s) 350 and the abutment 400 cause the free-moving ejector 300 to passively displace the egg from the securing arrangement 550. FIG. 5 illustrates the ejector 300 in a retracted position, while FIG. 6 illustrates the ejector 300 in a deployed position.

As shown in FIGS. 4-6, the stems 355 may extend through openings 504 (e.g., slots, holes, etc.) defined by the body 502. According to this particular aspect, ends 360 of the stems 355 are forced into contact with the abutment 400 to advance the engagement portion 310 toward the distal end 554 of the securing arrangement 550. In this regard, the piston rod 610 is retracted such that the body 502 affixed thereto is moved toward the abutment 400, thereby also advancing the stems 355 toward the abutment 400. As such, the stems 355 act as pistons pushing the engagement portion 310 toward the distal end 554, whereby the length of the stems 355 determines the distance at which the engagement portion 310 may be advanced. In some instances, the ejector 300 may include one or more detents 375 to prevent uncoupling of the ejector 300 from the egg securing device 600. The detents 375 may be an integral portion of the ejector 300 or otherwise may be a separate workpiece attached thereto. For example, the stems 355 may be bent to prevent the ends 360 from passing through the openings 504. In some instances, the driven member(s) 350 may operate in a pivot manner in which the driven member(s) 350 are pivoted through interaction with the abutment 400 so as to cause movement of the engagement portion 310 toward the distal end 554.

Figure 10:
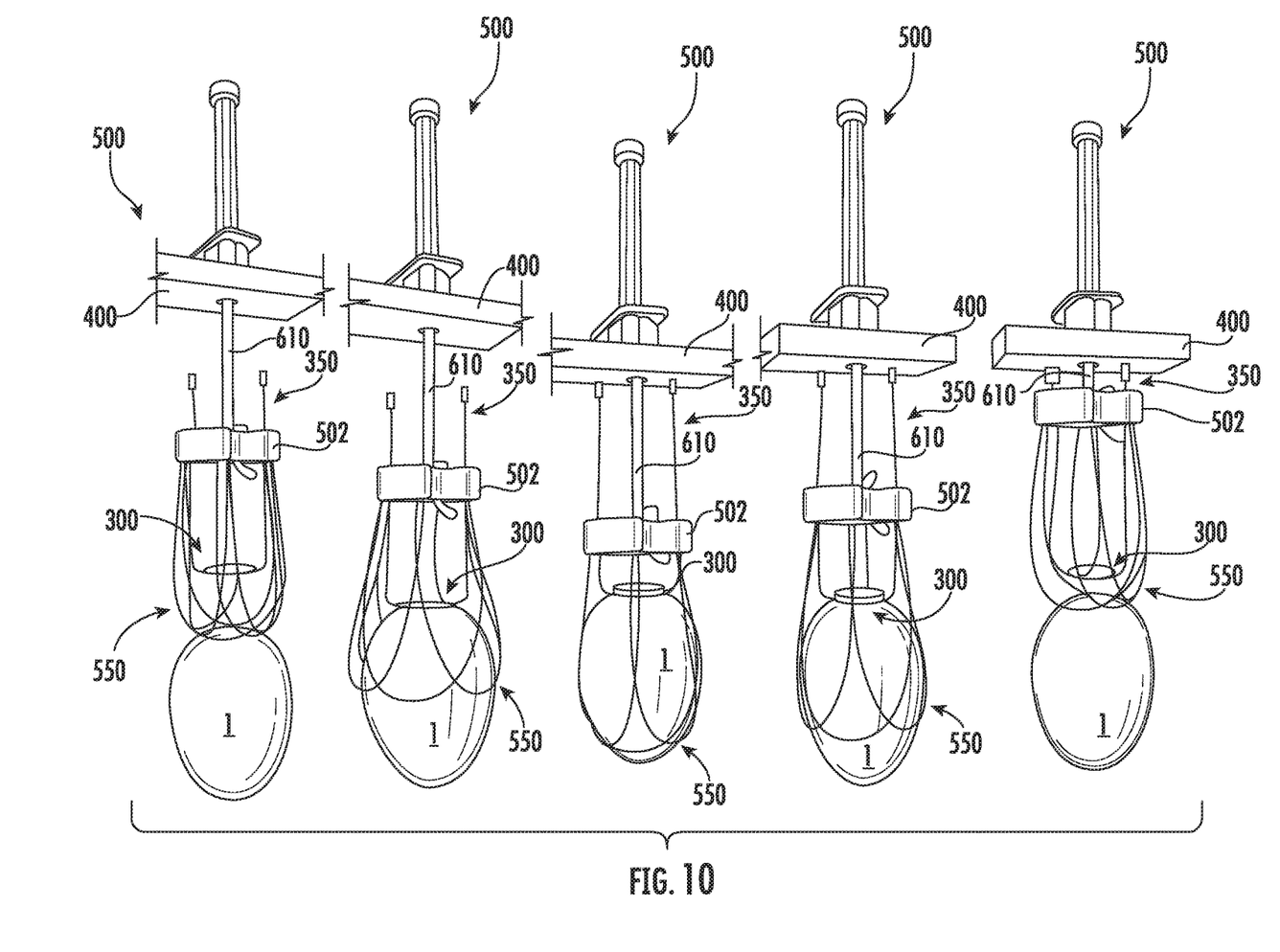
FIG. 10 illustrates an egg grasp and release sequence of an egg transfer module, according to one aspect of the present disclosure.

In operation, as shown in FIG. 10, an egg 1 may be presented or conveyed to a removal position beneath the egg transfer module 500. The egg securing device 600 begins at a fully raised, retracted or ascended position. The egg securing device 600 may then advance, deploy or descend to engage the egg 1 by actuation of the piston rod 610, at which point the securing arrangement 550 contacts the egg and begins to deflect. The securing arrangement 550 may be further advanced to a fully descended position until the egg 1 is fully seated therein or secured thereto for removal. During engagement of the egg 1, the engagement members 555 deflect and conform to the surface contour of the egg 1. As the egg 1 advances within the securing arrangement 550, the egg 1 contacts the ejector 300, thereby forcing the engagement portion 310 of the ejector 300 toward the body 502, with the stems 350 advancing toward the abutment 400. The egg 1 may then be transported to another location for processing or otherwise remain in the same position while an alternative container, such as a hatching basket, is positioned therebeneath to receive the egg.

The securing arrangement 550 may then be raised, retracted or otherwise ascended by actuating piston rod 610. As the securing arrangement 550 is retracted, the stems 355 contact the stationary abutment 400, which forces the stems 355 in a direction opposite the direction of travel of the securing arrangement 550. In this manner, the engagement portion 310 is forced away from the body 502 and toward the distal end 554, thereby exerting a force on the egg 1 so as to displace the egg 1 from the securing arrangement 550. Once the securing arrangement 550 is fully retracted, the egg 1 has been dislodged therefrom in a passive manner. The released egg 1 may then be transported or processed accordingly.

In some instances, as shown in FIG. 11, the driven members 350, such as stems 355, may be connected, other than by the engagement portion 310. For example, a retainer 700 may be provided to connect the portion of the driven members 350 extending beyond the body 502, opposite the side in which the securing arrangement 550 extends from the body 502. The retainer 700 may help limit or prevent twisting of the driven members 350 and, in turn, twisting of the ejector 300. According to one aspect, the ends 360 of the stems 355 may be bent and extended through the body 502 for insertion into respective holes 702 defined by the retainer 700. The ends 360 may be secured to the retainer by fasteners 750 such as, for example, screws. In this regard, the ejector 300 remains freely movable with respect to the body 502 in that the retainer 700 is not fixed to the body 502.

In some instances, the body 502 may include a main portion 525 and an insert 535 that may be coupled to the main portion 525 with appropriate fasteners. The main portion 525 may define keyholes 540 through which the stems 355 extend out of the body 502. FIG. 12 illustrates a portion of the egg transfer module 500, with the securing arrangement 550 removed for purposes of clarity. The retainer 700 may be of various sizes and shapes, with the purpose of connecting the driven members 350 outside of the securing arrangement 550. In such instances, the retainer 700 is also freely movable so as to be free moving when interacting with the abutment 400. That is, the retainer 700 may be used as the point of contact for the abutment 400. In some instances, however, the retainer 700 may be positioned below the ends 360 such that, even though the retainer 700 is implemented to limit twisting of the stems 355, the ends 360 are the point of contact for the abutment 400.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg transfer module, comprising:
   an egg securing device configured to grasp an egg and having a body from which a securing arrangement extends, the body defining a plurality of openings;
   a free-moving ejector associated with the egg securing device and configured to freely move in relation thereto, the free-moving ejector having a plurality of driven members, each driven member extending through one of the openings defined by the body; and
   a mechanical abutment in spaced relationship to the egg securing device, the free-moving ejector being configured to interact with the abutment to cause movement of the free-moving ejector with respect to the egg securing device, thereby displacing the egg from the egg securing device.

2. An egg transfer module according to claim 1, wherein the free-moving ejector is formed of a resilient material.

3. An egg transfer module according to claim 2, wherein the free-moving ejector is formed of a resilient wire structure.

4. An egg transfer module according to claim 1, wherein the free-moving ejector is at least partially arranged within the egg securing device.

5. An egg transfer module according to claim 1, wherein the securing arrangement comprises a plurality of engagement members.

6. An egg transfer module according to claim 5, wherein the free-moving ejector comprises an engagement portion for interacting with the egg and at least one stem portion extending through the body for interacting with the abutment.

7. An egg transfer module according to claim 1, further comprising a retainer configured to connect the driven members.

8. An egg transfer module according to claim 1, wherein the free-moving ejector comprises at least one detent to prevent uncoupling from the egg securing device.

9. A method of transferring eggs, the method comprising:
   grasping an egg with an egg securing device;
   moving the egg with the egg securing device;
   displacing the egg from the egg securing device with a free-moving ejector coupled to the egg securing device and configured to freely move in relation thereto, the free-moving ejector being configured to interact with a mechanical abutment to cause movement of the free-moving ejector with respect to the egg securing device, the egg securing device having a body from which a securing arrangement extends, the body defining a plurality of openings through which the free-moving ejector freely moves, and further wherein the free-moving ejector comprises a plurality of driven members extending through the openings of the body, and wherein a retainer is configured to connect the driven members.

* * * * *